O. H. NEBEL.
MOUSE TRAP.
APPLICATION FILED MAR. 6, 1911.
1,005,740.
Patented Oct. 10, 1911.
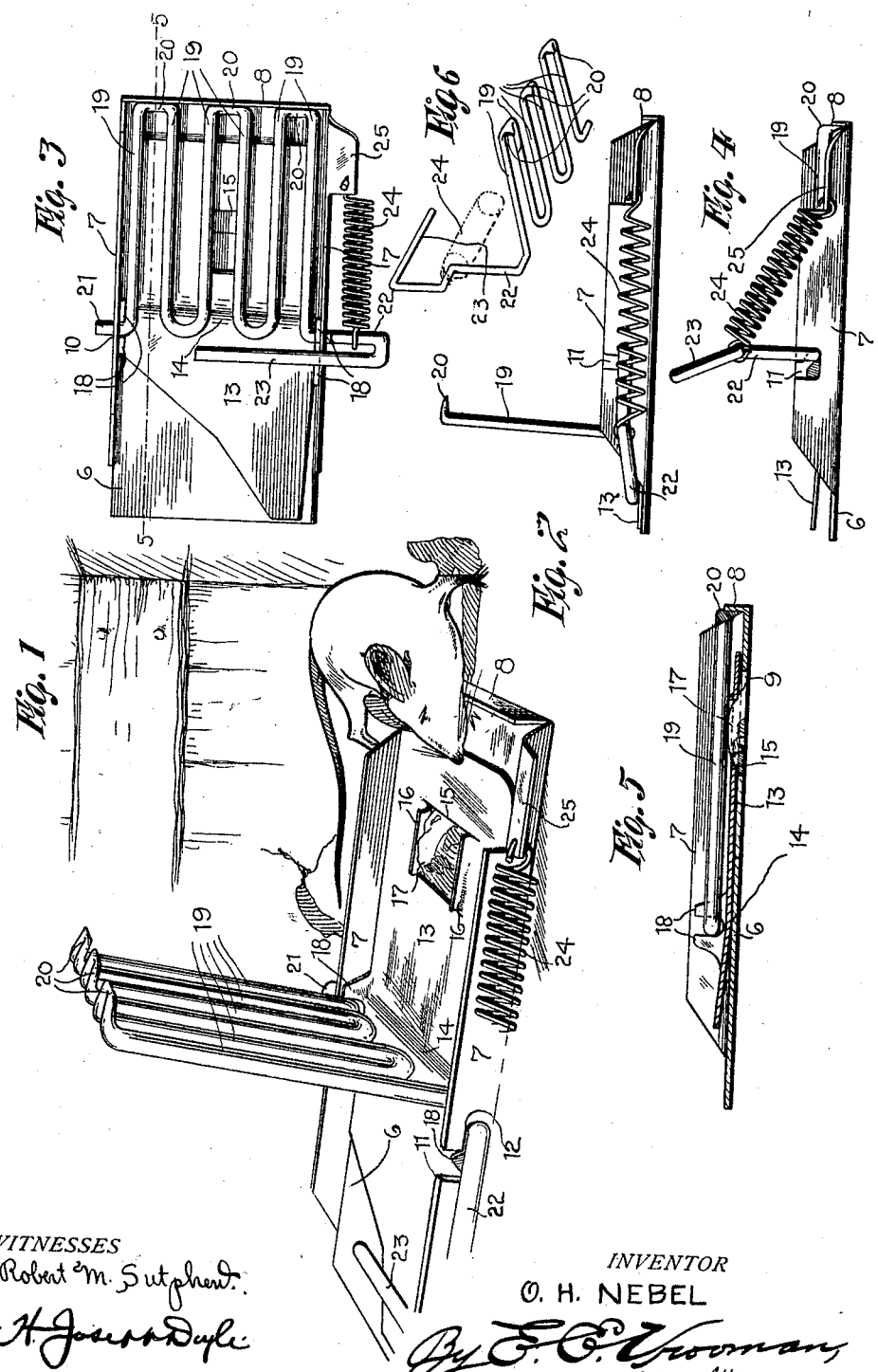
WITNESSES
Robert M. Sutphen
H. Joseph Doyle
INVENTOR
O. H. NEBEL
By E. E. Vrooman,
his Attorney.

UNITED STATES PATENT OFFICE.

OSCAR H. NEBEL, OF MADISON, SOUTH DAKOTA.

MOUSE-TRAP.

1,005,740. Specification of Letters Patent. Patented Oct. 10, 1911.

Application filed March 6, 1911. Serial No. 612,540.

*To all whom it may concern:*

Be it known that I, OSCAR H. NEBEL, citizen of the United States, residing at Madison, in the county of Lake and State of South Dakota, have invented certain new and useful Improvements in Mouse-Traps, of which the following is a specification, reference being had therein to the accompanying drawing.

This invention relates to mice and rat traps and the principal object of the same is to provide a trap that can be readily "set" and which is tripped by the animal stepping on the same so that a jaw is released that instantly kills the animal.

With the above generally stated objects of the invention in view it is contemplated providing a trap that is formed of few parts which are simple in construction and can be readily produced at a low cost.

In the accompanying drawings a preferred and practical embodiment of the invention has been shown, wherein:—

Figure 1 is a perspective view of the improved trap shown "set". Fig. 2 is a side view thereof. Fig. 3 is a top plan view of the trap, the trap being shown after having been tripped. Fig. 4 is a side view thereof. Fig. 5 is a longitudinal sectional view taken on the line 5—5, Fig. 3. Fig. 6 is a perspective view of the clamping jaw.

Referring to the accompanying drawings by numerals, it will be seen that the improved trap comprises a flat base 6 that is preferably formed of sheet metal and has its longitudinal side edges and its forward transverse edge upturned to provide the guard flanges 7 and 8. The base 6 is provided with an opening 9 in its forward portion, and one side flange 7 is provided with a transverse bearing opening 10. The other side flange is provided with a guide slot 11 that leads to a bearing recess 12 that is in alinement with bearing opening 10.

A tripping plate 13 is seated on the base 6 said plate being preferably formed of sheet metal and transversely bent at its center, as indicated at 14. Plate 13 is provided with a forward opening 15 that is in alinement with the opening 9, the sides of said opening 15 being provided with upstanding flanges 16 for holding a bait 17 that is forced up through openings 9 and 15. Plate 13 has spaced upstanding ears 18 projecting upwardly from its longitudinal sides which are arranged in alinement with the bearing opening 10 and recess 12.

A jaw is provided for clamping the animal that steps on the forward end of the plate 13, said jaw being preferably formed of a single length of rod material that is shaped to provide a plurality of spaced parallel bars 19 the loops 20 which connects the forward ends thereof being bent at substantially right angles to said bars and sharpened at one end. The jaw is provided with a right angularly projecting stub shaft 21 that is journaled in bearing opening 10, and extends between one set of the pivot ears 18. The opposite end portion of the jaw is provided with an elongated right angularly projecting crank 22 from which the setting lever 23 projects. Said lever 23 is elongated and extends transversely across the rear end portion of the plate 13. The crank 22 extends between one set of the ears 18 and is journaled in the bearing recess 12. The crank 22 projects laterally beyond the adjacent flange 7 and its projected portion has a spring 24 connecting with a flattened portion 25 at the forward end portion of said flange.

The rear end portion of the tripping plate 13 is preferably cut-away to reduce its weight, and said plate being transversely bent at its center, it will be seen that normally the forward end of the plate is in contact with the base 6 and the rear end slightly elevated, this being due to the fact that the forward end is heavier than the rear end.

In use the trap is baited, as has been described, and the setting lever 23 rocked rearwardly to raise the clamping jaw. When set, the lever 23 lies across the rear end of the tripping plate 13 and its weight depresses said end. When in this position, the spring 24 is expanded, but its pull is in a direction tending to cause the crank 22 to press the lever 23 on the plate 13. It will, therefore, be seen that as the animal steps on the elevated forward portion of the plate 13, the weight of the animal will depress said forward portion and elevate the rear portion with the result that the lever 23 rocks the crank 22 past the dead center, whereupon the tension of the spring 24 pulls the crank 22 forward and thereby forcibly rocks the clamping jaw onto the forward end of the plate 13 so that the animal is crushed between said jaw and plate.

As will be clear from the foregoing, the plate 13 is held to the base 6 by means of the end crank and stub shaft of the clamping jaw, and said jaw is held to the base by the bearing opening 10 and recess 12. Obviously the guide slot 11 provides simple means whereby the jaw can be released from said base whereupon the plate 13 can be lifted from the base, thereby permitting all parts to be separated. The spring 24 having hook engagements with the crank 22 and the flange 7, said spring can be readily removed.

What I claim is:—

1. A trap comprising a base provided with side flanges on its longitudinal edges and also its front transverse edge, a laterally projecting flange extending from the forward portion of one of the longitudinal side flanges, a tripping plate seated on said base, a clamping jaw having a shaft that is journaled in one side of said base and a crank that is journaled in the opposite side of said base, a setting lever carried by said crank and extending across said base and normally lying on the rear end of said plate, and a spring connection between said crank and said laterally projecting flange.

2. A trap comprising a base, a clamping jaw formed of a single length of material shaped to provide spaced parallel bars having loop connections at their forward ends, said loop connections being bent at right angles to the bars and sharpened, and the end of said jaw being provided with a shaft that is journaled in one side of said base, the other end of said jaw having a crank journaled in the opposite side of said base, a setting lever projecting from said crank and extending across said base, a spring connection between said crank and the forward portion of said base, and tripping means carried by said base for engaging said setting lever.

3. A trap comprising a base, a tripping plate seated thereon, said base and plate being provided with coöperating bait holding means at their forward portions, a clamping jaw formed of a single length of material shaped to provide spaced parallel bars having loop connections at their forward ends, said loop connections being bent at right angles to the bars and sharpened, one end of said jaw being provided with a shaft that is journaled in one side of said base, the other end of said jaw having a crank journaled in the opposite side of said base, a setting lever projecting from said crank and extending across said base and normally lying on the rear end of said plate, and a spring connection between said crank and the forward portion of said base.

In testimony whereof I hereunto affix my signature in presence of two witnesses.

OSCAR H. NEBEL.

Witnesses:
D. W. NEWTON,
FRANK ALBERT.

---

Copies of this patent may be obtained for five cents each, by addressing the "Commissioner of Patents, Washington, D. C."